Sept. 1, 1959 E. G. HILLS 2,902,598

DOUBLE CONVERSION MULTI-BAND TUNING UNIT

Filed March 31, 1953 3 Sheets-Sheet 1

INVENTOR.
Elmer Guy Hills
BY
Mason, Kolehmainen, Rathburn & Wyss
Attys

Sept. 1, 1959 E. G. HILLS 2,902,598

DOUBLE CONVERSION MULTI-BAND TUNING UNIT

Filed March 31, 1953 3 Sheets-Sheet 2

INVENTOR.
Elmer Guy Hills
BY Mason, Kolehmainen, Rathburn & Wyss
Att'ys

DOUBLE CONVERSION MULTI-BAND TUNING UNIT

Filed March 31, 1953 3 Sheets-Sheet 3

INVENTOR.
Elmer Guy Hills
BY Mason, Kolehmainen, Rathburn & Wyss, Attys

United States Patent Office 2,902,598

Patented Sept. 1, 1959

2,902,598

DOUBLE CONVERSION MULTI-BAND TUNING UNIT

Elmer Guy Hills, Des Plaines, Ill., assignor of one-half to Radion Corporation, Chicago, Ill., a corporation of Illinois Application March 31, 1953, Serial No. 345,777

9 Claims. (Cl. 250—20)

The present invention relates to a tuner unit for receiving signal modulated carrier waves of different frequencies, and, more particularly, to a tuner unit which is adapted to receive signals from any one of a plurality of relatively low frequency television stations and is also adapted to receive signals from any one of a plurality of relatively high frequency television stations. While the invention is of general utility for various tuner applications, it is particularly adapted for use in and will be described in connection with a field strength meter for determining the relative and absolute strength of signals received in both a low frequency and a high frequency television band.

Under present standards, commercial television transmitting stations are assigned to the so-called VHF, or very high frequency band. This band comprises a group of 12 channels, each 6 mc. wide, which occupy the frequency bands of 54 mc. to 88 mc. and 174 mc. to 216 mc. While these VHF stations are grouped in two different frequency bands, they are, nevertheless, all considered low frequency stations and these VHF stations will be referred to collectively in this specification as relatively low frequency television stations. In addition to the VHF band, and additional frequency band has recently been allocated to commercial television. This new band is called the UHF, or ultra-high frequency band, and includes some 70 channels, each 6 mc. wide, which occupy the frequency band of from 460 mc. to 890 mc.

In order to provide facilities for receiving stations in the UHF television band as well as the VHF television band, certain combined UHF-VHF tuner arrangements have been heretofore proposed for receiving signals in both of these bands. However, most, if not all, of these prior art arrangements have employed one or more tuned circuits for each station in the UHF band, these tuned circuits being provided for the purpose of selectivity and image rejection. These UHF tuned circuits are necessarily complicated and are frequently operated in tandem so that complex tracking problems arise. Furthermore, these prior art tuning arrangements for combined UHF-VHF reception usually employ a separate oscillator which operates in the UHF band and the design of a suitable UHF oscillator with adequate stability, power output, etc. is an additional problem presented in these arrangements. Also, with the advent of the UHF commercial television band an increasing number of combined UHF-VHF antenna installations are required and it is, therefore, desirable to provide a combined UHF-VHF tuner which may be conveniently used in a portable field strength meter for calibrating and optimizing television installations in both the UHF and VHF television bands.

Accordingly, it is an object of the present invention to provide a new and improved tuner arrangement wherein one or more of the above-described difficulties of the prior art arrangements are avoided.

It is another object of the present invention to provide a new and improved tuner unit for receiving signals in the UHF television band wherein no tuned circuits in the UHF band are employed, while providing excellent image rejection, spurious response rejection, and low oscillator radiation.

It is a further object of the present invention to provide a combined UHF-VHF tuner unit for use in a field strength meter unit wherein the UHF portion is of extremely simple design and provides stable and reliable operation in the UHF band, and the meter unit may be easily calibrated, is of light weight and consumes very little power.

It is a still further object of the present invention to provide a new and improved portable field strength meter for determining the relative and absolute strength of signals in both the UHF and VHF band wherein increased selectivity and amplification is provided for signals in the VHF band without employing tuned circuits and a separate oscillator for signals in the UHF band.

The invention, both as to its organization and method of operation, together with further objects and advantages thereof, will best be understood by reference to the following specification taken in connection with the accompanying drawings, in which.

Figure 1:
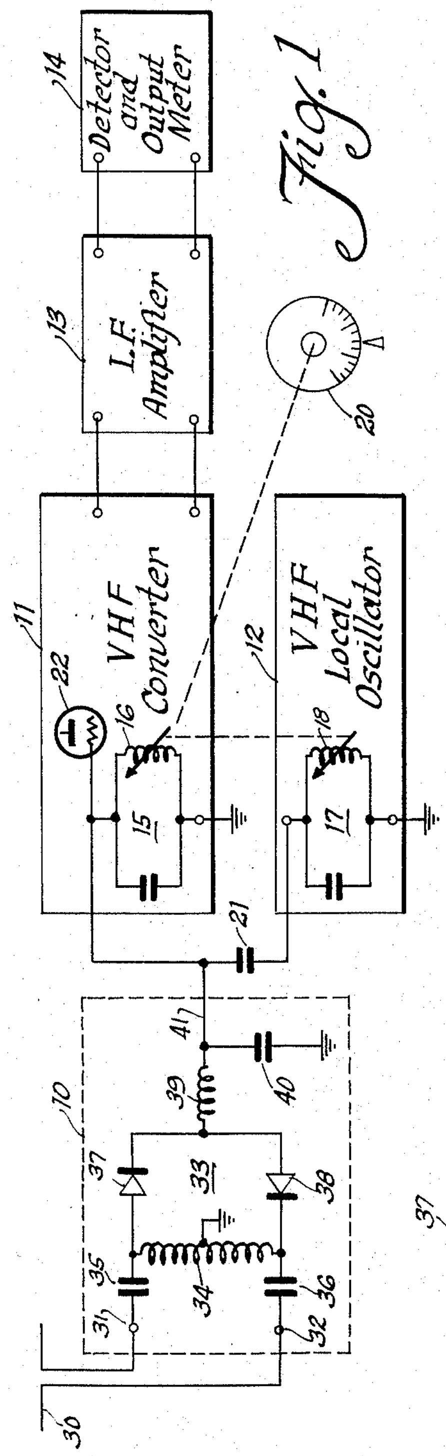
Fig. 1 is a schematic diagram, partly in block diagram form, of a tuner unit embodying the features of the present invention.

Referring now to the drawings and, more particularly, to Fig. 1 thereof, the tuner unit of the present invention is therein illustrated in connection with a field strength meter unit which may be employed to measure either the absolute value of a received signal or a small percentage change in the received signal. More particularly the tuner unit of Fig. 1 includes a UHF portion indicated generally at 10, a VHF converter unit 11, a VHF local oscillator 12, an I.F. amplifier 13, and a detector and output meter 14. The tuner unit of Fig. 1 is capable of selectively receiving signals in either the VHF or the UHF television bands. However, in order to simplify the description thereof and to facilitate an understanding of the operation of the system for reception of signals in the UHF television band, the circuit interconnections for reception of VHF signals have been omitted in Fig. 1, these circuit connections being shown and described in detail in connection with Fig. 2 of the drawings.

The VHF converter 11 includes a tuned circuit 15, the resonant frequency of which may be continuously varied to receive signals throughout the VHF frequency band of 54 mc. to 216 mc. In the illustrated embodiment the inductive branch 16 of the resonant circuit 15 is illustrated as being continuously variable to tune the circuit 15 to the desired frequencies. However, it will be understood that the capacitive branch of the circuit 15 may equally well be made continuously variable insofar as the present invention is concerned. The VHF local oscillator includes a tuned circuit 17 which is employed as the frequency determining element of the oscillator 12 and may be continuously tuned to give the correct local oscillator frequency for reception of signals in the VHF television band. In the illustrated embodiment the inductive branch 18 of the circuit 17 is made continuously variable. However, it will be understood that the capacitive branch of the circuit 17 may equally well be employed as the frequency controlling element insofar as the present invention is concerned.

The variable inductances 16 and 18 are ganged together and the common tuning shaft is connected to an indicator scale 20, the scale 20 being calibrated in both VHF and UHF frequencies as will be described in more detail hereinafter. The local oscillator signal developed across the tuned circuit 17 in the local oscillator 12 is coupled through the condenser 21 to the control grid of a converter tube 22 in the VHF converter 11 so that the received signal and the local oscillator signal may be mixed or heterodyned in the converter 11 and the conventional heterodyne frequencies produced. In the illustrated embodiment, the local oscillator 12 is operated above the frequency of a received VHF signal by a frequency differential of 20 mc. so that a 20 mc. I.F. signal is developed in the output of the converter tube 22. However, it will be understood that the frequency relationship of the local oscillator signal to the received VHF signal may be varied, if desired, to provide more complete suppression of undesired signals, as will be described in more detail hereinafter.

The I.F. signal developed in the output circuit of the tube 22 is amplified in the amplifier 13 and is impressed upon the detector 14 so as to produce an output signal the amplitude of which is proportional to the strength of the received signal, this output signal being applied to a suitable output meter to provide a visual indication of the strength of the received signal.

Considering briefly the operation of the above-described units for reception of signals in the VHF television band and assuming that these signals are impressed by suitable antenna means and coupling means on the control grid of the converter tube 22, if it is desired to receive a VHF signal having a frequency of 200 mc. the tuned circuit 15 in the converter 11 would be tuned to the frequency of 200 mc. and the tuned circuit 17 in the local oscillator 12 would be tuned to the frequency of 220 mc., the local oscillator signal and the received VHF signal being heterodyned in the tube 22 so as to produce in the output circuit thereof a 20 mc. I.F. signal which is employed to derive a visual indication of the strength of the received signal. Under these conditions the indicator scale 20 would have a VHF setting of 200 mc.

Considering now the operation of the UHF portion 10 of the tuner unit of Fig. 1, signals in the UHF television band, which are received by the UHF antenna 30 are connected to the input terminals 31 and 32 of the UHF portion 10 and a balanced detector network, indicated generally at 33 is connected across the input terminals 31 and 32. More specifically, one end of an input coil 34 is connected through the condenser 35 to the input terminal 31 and the other end of the coil 34 is connected through the condenser 36 to the input terminal 32, the center tap of the coil 34 being connected to ground to provide a balanced input circuit. A pair of crystal rectifiers 37 and 38 are connected in series across the input coil 34, these rectifiers being connected in the same polarity around the series loop formed by the coil 34 and the rectifiers 37 and 38. A coil 39 and condenser 40 are connected in series from the common junction point of the rectifiers 37 and 38 to ground and the output signal developed across the condenser 40 is connected by way of the conductor 41 to the control grid of the VHF converter tube 22.

For the reception of signals in the UHF television band all of the signals in the UHF television band which are within the range of the antenna 30 are impressed upon the balanced detector network 33. In addition, the third harmonic of the local oscillator signal developed across the tuned circuit 17 in the local oscillator 12 is also coupled through the condenser 21 to the balanced detector network 33, as is the fundamental frequency component of the local oscillator signal. Accordingly, for a particular VHF setting of the dial 20 the third harmonic of the local oscillator signal may be heterodyned with the incoming UHF signal in the balanced detector 33 so as to produce a sum or difference frequency which can be passed by the tuned circuit 15 in the converter 11 for the same setting of the dial 20. Thus, considering the situation wherein the dial 20 is set for the reception of a VHF signal of 200 mc., under these conditions the local oscillator signal has a frequency of 220 mc. and the third harmonic of this local oscillator signal has a frequency of 660 mc. Accordingly, the 660 mc. local oscillator frequency component may be heterodyned with an incoming UHF signal of 860 mc. and a heterodyne frequency of 200 mc. will be produced on the output conductor 41 which is of the correct frequency for transmission by the tuned circuit 15. In addition, the fundamental frequency component of the local oscillator signal has a frequency of 220 mc. which is of the correct frequency to heterodyne with the above-described 200 mc. heterodyne signal so that an I.F. signal of 20 mc. is produced by the converter 11 and may be amplified in the I.F. amplifier 13. It will therefore be seen that when the indicator scale 20 has a VHF setting of 200 mc. the tuner unit is also capable of receiving a UHF signal of 860 mc. for the same setting of the scale 20. Accordingly, the scale 20 may be calibrated for both UHF and VHF signals.

Figure 5:
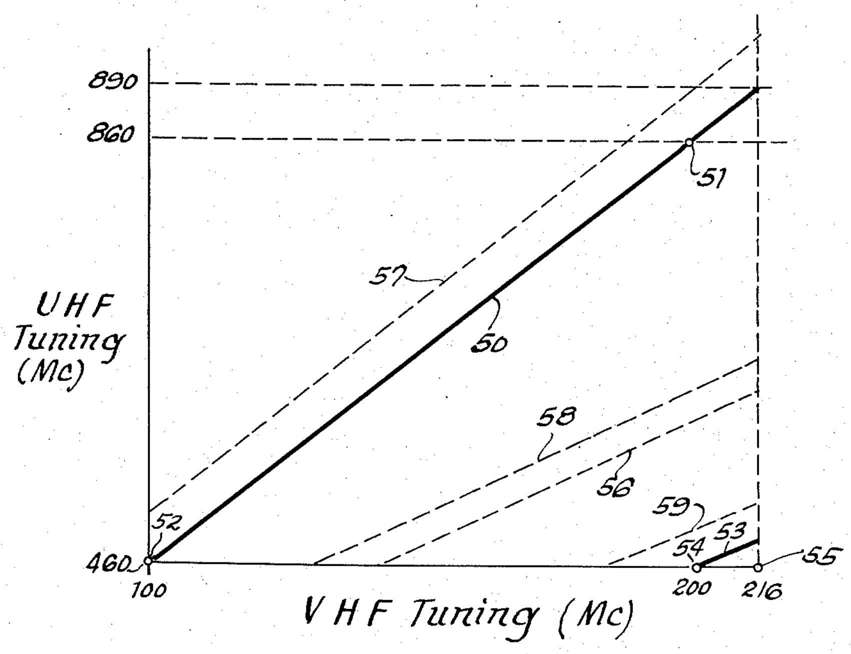
Fig. 5 is a graph illustrating the tuning characteristics of the tuner unit of the present invention.

In order to facilitate an understanding of the operation of the tuner unit of Fig. 1 for reception of UHF signals, there is shown in Fig. 5 of the drawings a graph correlating the UHF and VHF tuning characteristics of the unit. Referring to this figure, the actual UHF-VHF tuning characteristic of the unit is illustrated by the curve 50. Thus, when the scale 20 is set for reception of a VHF signal of 200 mc. the tuner unit is also capable of receiving an 860 mc. UHF signal as indicated by the point 51 on the curve 50. At the other end of the tuning characteristic it will be seen that when the scale 20 is set for a reception of a VHF signal of 100 mc., as indicated by the point 52 on the curve 50, the tuner unit is capable of receiving a 460 mc. UHF signal for the same dial setting. This will be readily understood when it is realized that for reception of a 100 mc. VHF signal the local oscillator third harmonic has a frequency of 360 mc. which may be heterodyned with the 460 mc. UHF signal to produce a heterodyne frequency of 100 mc. which may be received by the VHF portion of the tuner unit and the fundamental of the local oscillator signal may be heterodyned with this 100 mc. signal to produce the desired I.F. signal of 20 mc.

It will be observed that the third harmonic of the local oscillator signal can also be heterodyned with the image of the desired UHF signal and at the high end of the UHF band this image signal may also be received as shown by the curve 53 in Fig. 5. Thus, when the tuner unit is set to receive a VHF signal of 200 mc. the third harmonic of the local oscillator signal has a frequency of 660 mc. which may be heterodyned with an incoming 460 mc. UHF signal to produce a 200 mc. heterodyne signal as indicated by the point 54 on the curve 53. However, interference from the UHF image signal may be completely eliminated by employing a lower I.F. signal than the illustrated 20 mc. I.F. signal. Thus, if an I.F. signal of 9.33 mc. is employed, no image signal is receivable by the tuner unit until the highest frequency UHF signal i.e. 890 mc. is tuned in, in which case the image frequency of 460 mc. appears only at the VHF tuning frequency of 216 mc. as indicated by the point 55 in Fig. 5. In the general case, the highest I.F. frequency for no image response is equal to one-third the difference obtained by subtracting twice the highest frequency in the VHF (low) frequency band from the lowest frequency in the UHF (high) frequency band.

In this connection, it will be understood that when the tuner unit is employed as a field strength meter the spurious image responses of the tuner unit at the upper end of the frequency band is not particularly important so that an I.F. of 20 mc. has been employed. However, if the tuner unit is employed in an actual television receiver to select television signals in the upper UHF frequency range, then a lower I.F. signal could be employed to prevent the above-described image response in this frequency range.

In order to prevent the UHF portion 10 of the tuner unit from responding to signals in the VHF band, i.e. signals below the lower limit of the UHF television band, there is provided means for preventing signals below 460 mc. from being impressed upon the crystal rectifiers 37 and 38. More particularly, the condensers 35 and 36 and the input coil 34 may comprise a high pass filter which cuts off below 460 mc. so that these signals are prevented from reaching the rectifiers 37 and 38. Since the tuner unit has no image response up to the frequency of 890 mc. when a 9.33 mc. I.F. signal is employed and signals below 460 mc. are prevented from reaching the balanced detector network the tuner has substantially no image response.

In order to prevent the second harmonic of the local oscillator signal from heterodyning with the incoming UHF signals and producing spurious responses, the local oscillator 12 is arranged so that it does not generate any appreciable amount of second harmonic signal. Suppression of the second harmonic of the local oscillator signal may be made in any suitable manner as by providing a push-pull oscillator or other symmetrical wave oscillator or by employing a very small coupling condenser for the third harmonic component which will not pass any substantial amount of second harmonic signal as will be readily apparent to those skilled in the art. The curve 56 in Fig. 5 illustrates the spurious tuning characteristic which would arise if an appreciable amount of second harmonic local oscillator signal were injected into the balanced detector network 33. The VHF portion of the tuner is also preferably arranged so that this portion of the tuner has good image rejection in the VHF frequency band, such image rejection for VHF signals being achieved by any suitable means such as adequate selectivity of the tuned circuit 15, suitable trap circuits or other arrangements well known to those skilled in the art. The spurious response of the tuner unit if good image rejection in the VHF television band is not provided is illustrated by the curves 57, 58 and 59 in Fig. 5. However, it will be understood that the curve 50 represents the sole tuning characteristic of the tuner unit of Fig. 1 if adequate image rejection in the VHF band is provided, the second harmonic of the local oscillator signal is suppressed and an I.F. of 9.33 mc. is employed, the curves 53, 56, 57, 58 and 59 being shown merely for the purpose of illustrating spurious response characteristics which may be avoided in the manner described in detail above.

In order to prevent radiation by the UHF antenna 30 of the frequency components of the local oscillator signal generated by the oscillator 12, a balanced detector network is employed, and the local oscillator signal is injected into this network at a point which is symmetrical with respect to ground. With this arrangement any oscillator signal components appearing on the conductor 41 do not appear at the input terminals 31 and 32 since the detector network 33 is balanced with respect to ground and signals impressed upon the network 33 from the conductor 41 are balanced out so that no oscillator signals are radiated from the antenna 30 and interference with adjacent receivers is prevented.

In considering the manner in which the incoming UHF signals are heterodyned with the third harmonic of the local oscillator signal in the balanced detector network 33 it will be understood that the rectifiers 37 and 38 should be connected in opposite polarity to the two ends of the coil 34 in order to obtain good heterodyning action of the UHF signal and the third harmonic of the local oscillator signal, even though these rectifiers may be connected in the same polarity to the two ends of the coil 34 insofar as the balanced operation of the detector is concerned. The balanced detector network 33 provides a variable impedance to the third harmonic of the local oscillator signal which is developed between the conductor 41 and ground and the condensers 21 and 40 form a voltage divider which determines the amount of local oscillator signal reaching the input of the converter 11. However, the condenser 40 is shunted by the impedance of the balanced detector network 33 to ground. It will be evident that if the signal between the input terminals 31 and 32 has one polarity both of the rectifiers 37 and 38 will conduct, thereby connecting the conductor 41 to ground through the coil 39 and the very low impedance of the two halves of the coil 34. When the signal between the terminals 31 and 32 has the opposite polarity the rectifiers 37 and 38 are non-conductive so that the impedance from conductor 41 to ground is very high. Since the polarity of the signal between the terminals 31 and 32 alternates at the UHF signal frequency the impedance that the rectifiers 37 and 38 present across the condenser 40 also alternates at this UHF frequency. Accordingly, the voltage division of the divider network 21 and 40 changes at the UHF signal rate so that the third harmonic of the local oscillator signal which reaches the input of the VHF converter 11 is modulated at the UHF signal rate and contains the sum and difference frequencies of the local oscillator third harmonic and the incoming UHF signal, the difference frequency being capable of reception by the VHF portion of the tuner as described in detail above. If the crystal rectifiers 37 and 38 are connected in the same polarity to the ends of the coil 34 the above-described variation in impedance between the conductor 41 and ground is not provided to a very large extent because when one of the rectifiers is conducting the other is not conducting and their conductive effects tend to cancel out so that a relatively small variation in impedance is produced thereby. While a balanced detector network is preferable from the standpoint of good signal to noise ratio, low oscillator radiation and good conversion gain, it will be understood that a single ended or, unbalanced detector network employing only one rectifier, such as the rectifier 37, may be employed if desired.

In order to present a relatively low impedance between the conductor 41 and ground at the UHF signal frequency so that a maximum amount of signal voltage may be developed across the rectifiers 37 and 38, the inductance 39 is provided, this inductance being series resonant with the condenser 40 in the UHF television band. With this arrangement a maximum UHF signal voltage is developed across the rectifiers 37 and 38 so that maximum conversion of the UHF signal to a corresponding signal in the VHF band is provided.

Figure 2:
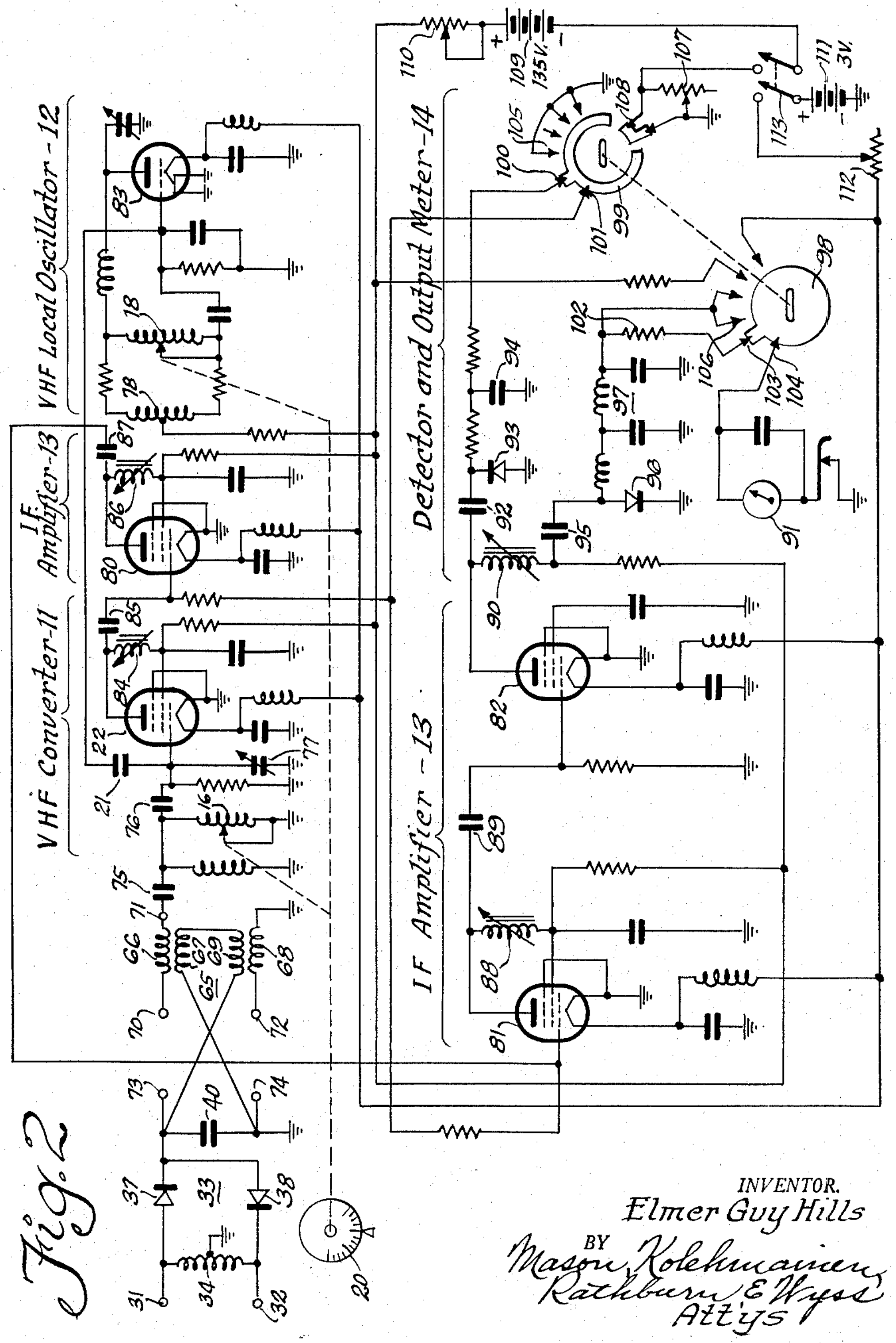
Fig. 2 is a schematic diagram illustrating the details of the tuner unit of the present invention as employed in a portable field strength meter arrangement.

In the tuner unit shown in Fig. 1, the details of the units 11, 12, 13 and 14 and an arrangement for injecting a VHF signal into the tuner unit have been omitted to simplify the description of the UHF portion of the tuner. In Fig. 2 there is shown schematically the details of these units together with a suitable arrangement for connecting either UHF signals or VHF signals to the tuner. Referring now to this figure, it is pointed out that corresponding circuit components have been identified in the two figures by the same reference numerals to simplify the description of the circuit of Fig. 2. In order to receive either UHF signals or VHF signals there is provided in the frequency meter tuner unit of Fig. 2 a balanced coupling network indicated generally at 65, this network including two pairs of coils, 66, 67, and 68, 69. The coil 66 is connected from the terminal 70 to the terminal 71 and the coil 68 is connected from the terminal 72 to ground. The coils 67 and 69 are connected in series and are cross connected to the terminals 73 and 74, the terminal 74 being also connected to ground.

When it is desired to receive UHF signals a UHF antenna is connected to the input terminals 31 and 32, a jumper is connected between the terminals 73 and 70 and another jumper is connected between the terminals 72 and 74. With this arrangement the rectifiers 37 and 38 conduct during alternate half cycles of the received UHF signals so as to vary the impedance across the condenser 40 in a manner identical to that described above in connection with Fig. 1. In this connection it will be understood that the condensers 21 and 40 act as a voltage divider network even though the additional coupling condensers 75 and 76 and the inductance 66 are connected between the condensers 21 and 40, since the components 75, 76 and 66 have relatively small impedance values at ultra high frequencies. Accordingly, the third harmonic of the local oscillator signal, which is coupled through the condenser 21 to the balanced detector is modulated by the received UHF signals so as to produce corresponding sum and difference frequencies, the difference frequency of one of these UHF signals being capable of reception by the VHF portion of the tuner. In this connection it will be understood that the tuned input circuit of the VHF converter 11 comprises the continuously variable inductance 16, the variable condenser 77 and the associated circuit capacities, the inductance 16 being capable of continuously tuning the input circuit of the converter tube 22 from 54 mc. to 216 mc. i.e., the upper and lower limits of the VHF television band. It will also be understood that the inductance 18 together with the inductance 78 and the associated circuit capacities forms the local oscillator tuned circuit and the inductance 18 is capable of continuously tuning the local oscillator 12 over the frequency band of from 74 mc. to 236 mc.

When it is desired to receive VHF signals the jumpers between the terminals 73, 70 and 74, 72 are removed, a single jumper is connected between the terminals 73 and 74 and a VHF antenna is connected between the terminals 70 and 72. With this arrangement the UHF signals which are received by the balanced detector network 33 are shunted out by means of the jumper across the terminals 73 and 74 and a balanced input circuit is provided for the VHF antenna connected to the terminals 70 and 72. The VHF signals which are impressed upon the terminals 70 and 72 are selectively impressed upon the input of the converter tube 22 by means of the tuned circuit including the inductance 16 and the local oscillator signal is also coupled to the grid of the tube 22 through the coupling condenser 21 so that a conventional mixer action takes place for the particular VHF signal transmitted by the tuned circuit including the inductance 16. As the scale 20 is changed the local oscillator and converter tuned circuits are varied in unison so as to provide a conventional superheterodyne action as will be understood by those skilled in the art. It will be noted that in the UHF portion of the tuner shown in Fig. 2 the coupling condensers between the input terminals 31 and 32 and the input coil 34 have been omitted. This is because the coil 34 is of sufficiently small impedance at frequencies below the UHF television band that adequate rejection of signals in the VHF band is provided without employing additional condensers to provide a high pass filter arrangement. However, it will be upnderstood that condensers similar to the condenser 35 and 36 may be employed in the circuit of Fig. 2 if necessary to provide adequate VHF signal rejection. It will also be noted that the condenser 40 is not series resonated by means of an inductance in the circuit of Fig. 2 since conversion of the UHF signal may be obtained without the use of such a series resonant circuit.

It will be further noted that the present invention provides a combined UHF-VHF tuner from a continuous type VHF tuner by employing only the additional input coil 34, the rectifiers 33 and 38, the condenser 40 and the balanced coupling network 65. Also, the provision of UHF tuning facilities does not require tuned circuits in the UHF band or a separate UHF oscillator. In addition, it will be noted that the network 65 is balanced with respect to ground for reception of VHF signals and is unbalanced with respect to ground for coupling UHF signals from the detector 33 to the VHF converter 11.

In considering the details of the converter 11, the I.F. amplifier 13 and the detector and output meter 14 which are shown in Fig. 2, it is pointed out that the converter tube 22, the I.F. amplifier tubes 80, 81 and 82 and the local oscillator tube 83 are all of the conventional filament type suitable for battery operation. The anode circuit of the converter tube 22 includes the inductance 84 which resonates with the associated circuit capacities at 20 mc. Signals developed across the inductance 84 are coupled through the condenser 85 to the control grid of the I.F. amplifier tube 80 which is also provided with an anode tuned circuit including the inductance 86. The I.F. signal developed across the inductance 86 is coupled through the condenser 87 to the tube 81, this tube also being provided with an inductance 88 which is tuned to 20 mc. Signals developed across the inductance 88 are coupled through the condenser 89 to the control grid of the last amplifier tube 82 and are reproduced in amplified form across the output inductance 90 of this tube. The output of the amplifier tube 82 is detected in two separate detector circuits, one of these detector circuits being employed to provide an automatic gain control voltage and the other of which is employed to derive an output signal which is impressed upon the meter 91.

More specifically, the I.F. signal developed across the inductance 90 is coupled through the condenser 92 to the crystal rectifier 93 so as to develop across the output condenser 94 a unidirectional signal which is employed as an A.G.C. voltage for the control grids of the amplifier tubes 80 and 81. In addition, a portion of the output voltage developed across the inductance 90 is coupled through the condenser 95 to the crystal rectifier 96 so as to provide an output signal at the output of a low pass filter network 97 connected across the rectifier 96.

In order to provide for calibration of the meter 91 and to provide different sensitivity ranges there is provided a 5 position selector switch which includes the sections 98 and 99 which are ganged together. In the first position of this selector switch a low sensitivity range is provided wherein the A.G.C. voltage developed across the condenser 94 is connected by way of the contacts 100 and 101 to the grid resistors of the amplifier tubes 80 and 81 and the output from the low pass filter 97 is connected through the series dropping resistor 102 and the contacts 103 and 104 to the meter 91. In the second position of the selector switch a high sensitivity range is provided wherein no automatic gain control is employed. In this position the grid resistors of the tubes 80 and 81 are connected to ground through the contacts 101 and 105 and the meter is directly connected to the output of the filter 97 through the contacts 106 and 104. In position 3 a variable sensitivity arrangement is provided while maintaining the full sensitivity connection to the meter 91. Thus, in position 3 the grid resistors of the tubes 80 and 81 are connected to the potentiometer 107 through the contacts 101 and 108, the potentiometer 107 being connected from the bottom end of +B battery 109 to ground so that a variable negative potential may be impressed upon the control grids of the tubes 80 and 81 to control the gain of these tubes manually. In position 4 the potential of the battery 109 is connected to the meter 91 through the potentiometer 110 so that a check of the battery potential can be made and in position 5 the potential of the filament battery 111 is connected through the potentiometer 112 to the meter 91 so as to check the filament potential which is impressed upon the tubes of the tuner unit.

An on-off switch 113 is employed to connect the filament and +B potential to the tubes of the field strength meter.

Figure 4:
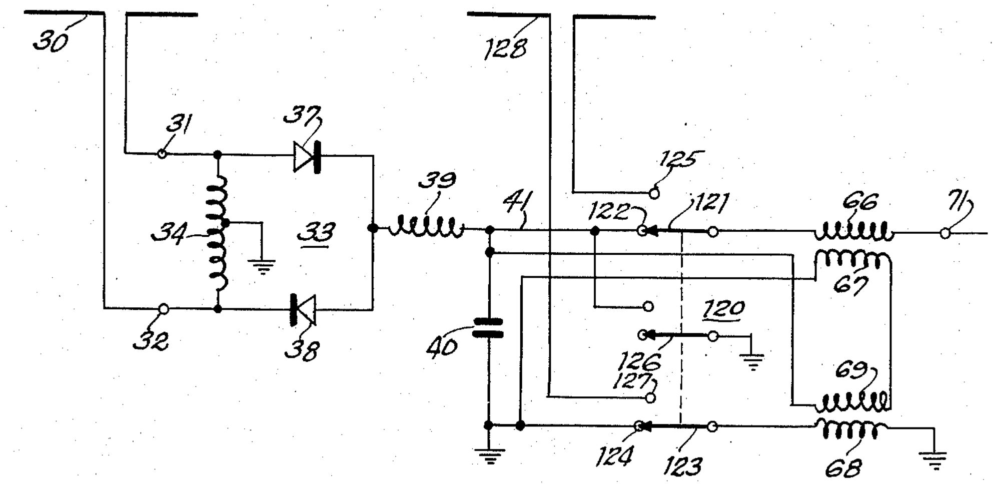
Fig. 4 is a schematic diagram of an alternative arrangement of a portion of the tuner unit of Fig. 2.

While the arrangement shown in Fig. 2, wherein jumpers are employed to change from UHF to VHF reception, is suitable for field applications of the field strength meter wherein difference antennas are selectively connected to the meter, in some instances it may be desirable to provide a selector switch so that UHF or VHF signals may be instantaneously switched to the input of the tuner. Such an arrangement is shown in Fig. 4 wherein circuit components corresponding to those of Figs. 1 and 2 have been given the same reference numerals. Referring to this figure, a selector switch 120 is provided and is employed selectively to connect the UHF antenna 30 or a VHF antenna 128 to the tuner unit. In the UHF position shown in Fig. 4 the movable arm 121 of the selector switch 120 is connected to the terminal 122 and the movable arm 123 is connected to the terminal 124 so that the coil 68 is short-circuited and the coil 66 is connected to the condenser 40. In this position the VHF antenna 128, which is connected to the terminals 125 and 127 of the switch 120 is out of the circuit. UHF signals which are received by the antenna 30 are coupled to the balanced detector network 33 and are heterodyned with the third harmonic of the local oscillator in a manner identical to that described above in connection with Figs. 1 and 2. In the VHF position of the switch 120 the arm 121 is connected to the terminal 125 and the arm 123 is connected to the terminal 127 so that the VHF antenna 128 is connected to the balanced input coils 66 and 68. Also, in the VHF position the arm 126 of the switch 120 connects the terminal 122 to ground so that the condenser 40 is short-circuited and signals produced cross this condenser are not coupled to the input of the VHF converter 11. In this connection it will be understood that the contacts of the switch 120 preferably have a relatively low capacity between terminals so as to prevent pick up between the UHF and VHF circuits.

While the UHF and VHF converter units shown in Figs. 1, 2 and 4, i.e., the units 10, 11 and 12, have been illustrated in connection with an output meter circuit whereby a visual indication of the magnitude of the received signal may be obtained, it will be understood that the tuner unit may be employed in a television receiver in which case the output of the converter 11 would be impressed upon the I.F. amplifier of the television receiver as will be readily understood by those skilled in the art. In such event the selector switch of Fig. 4 is preferably employed to provide instantaneous selection of stations in either the UHF or the VHF television band.

Figure 3:
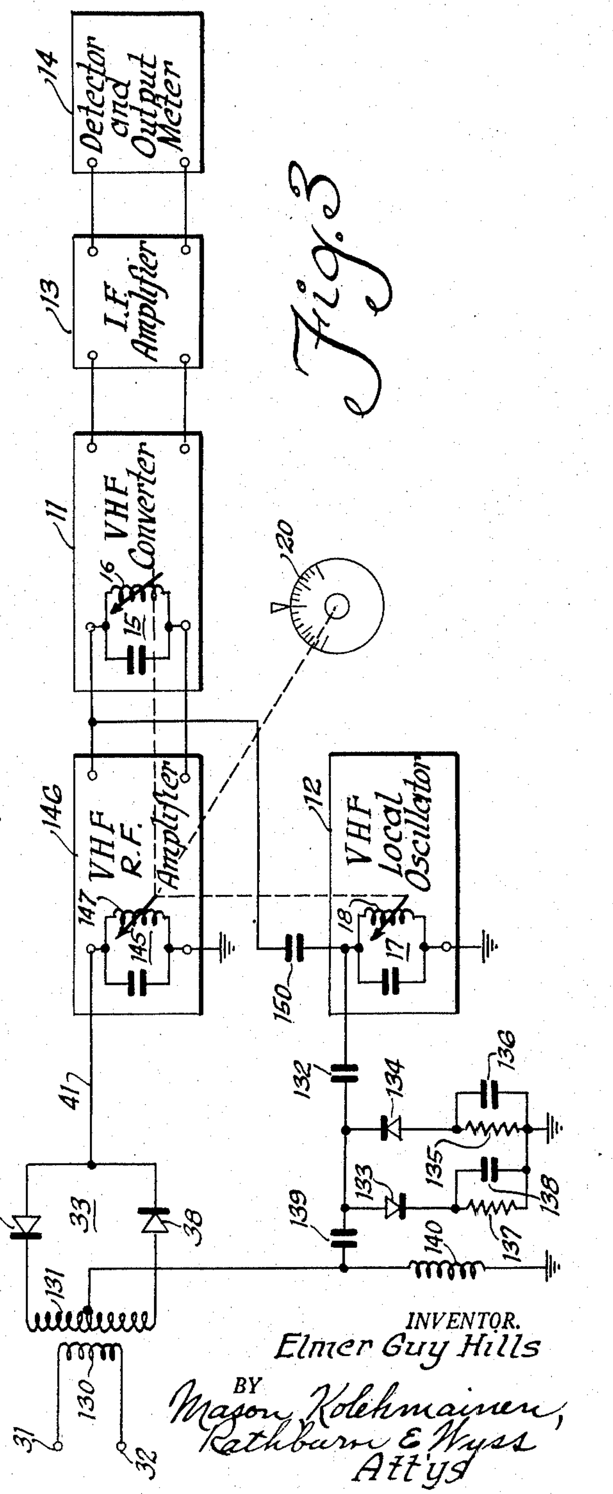
Fig. 3 is a schematic diagram, partly in block diagram form, of an alternative embodiment of the present invention.

In Fig. 3 there is shown an alternative embodiment of the present invention wherein an R.F. stage may be employed in the VHF portion of the tuner, the UHF-VHF switching connections being omitted as in Fig. 1 for purposes of simplicity. Referring to Fig. 3, the UHF signals coupled to the input terminals 31 and 32 are connected to the primary 130 of an input transformer the secondary 131 of which corresponds to the input coil 34 shown in Fig. 1. In order to permit the use of an R.F. amplifier stage in the VHF portion of the tuner the output of the local oscillator 12 is connected to the balanced detector 33 over one path and the output of this oscillator is coupled to the VHF converter 11 over a different path. More specifically, the local oscillator signal developed across the tuned circuit 17 in the local oscillator 12 is coupled through the condenser 132 to a symmetrical distortion network including the crystal rectifiers 133 and 134. The cathode of the rectifier 134 is connected through the resistor 135 to ground and a condenser 136 is connected across the resistor 135. In a similar manner the anode of the rectifier 133 is connected through the resistor 137 to ground and a condenser 138 is connected across the resistor 137. The symmetrical network including the rectifiers 133 and 134 functions to convert the sine wave developed by the local oscillator 12 into a symmetrical square wave having on and off intervals of approximately equal duration so that no even harmonics are produced at the output of this symmetrical distortion network. The square wave produced by the clipping action of the rectifiers 133 and 134 is coupled to a high pass filter including the condenser 139 and the inductance 140 so that only the third and higher odd harmonics of the original oscillator signal are developed across the inductance 140. The third harmonic signal developed across the inductance 140 is connected to the center tap of the secondary 131 so that this third harmonic local oscillator signal is injected into the balanced detector network 33. The detector network 33 functions in a conventional manner to develop an output voltage on the conductor 41 thereof which contains the incoming UHF signals and the third harmonic component of the local oscillator signal as well as the sum and difference frequencies resulting from the heterodyning action of the detector. The composite signal developed on the conductor 41 is impressed upon the tuned circuit 145 of an R.F. amplifier 146, the tuned circuit 145 being continuously variable over the VHF television band by means of the variable inductance 147 which is ganged to the converter and local oscillator tuned circuits so as to be tuned in unison therewith. The tuned circuits 15 and 145 are both tuned to the desired VHF signal and the amplifier 146 provides additional selectivity at this frequency as will be well understood by those skilled in the art. In order to convert either the received VHF signal or the heterodyned UHF signal to the desired I.F. signal the output of the local oscillator is also coupled through the condenser 150 to the tuned circuit 15 of the VHF converter 11. Since the R.F. amplifier 146 is interposed ahead of the local oscillator connection to the converter 11 only the fundamental component of the local oscillator signal which is coupled through the condenser 150 to the VHF converter 11 is effective to heterodyne with the incoming VHF signal or the heterodyned UHF signal to produce the desired I.F. signal which is then amplified in the amplifier 13. In this connection it will be understood that the tuner unit of Fig. 3 may also be employed as the tuning unit in a television receiver instead of the illustrated frequency meter as will be readily understood by those skilled in the art.

While there have been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. A tuner for receiving signals in two different frequency bands, comprising a first converter stage including a tuned circuit for selectively receiving signals in one of said frequency bands, a local oscillator, means or coupling energy to said first converter stage from said local oscillator, a second converter stage, means for simultaneously impressing signals received from a plurality of stations in said other frequency band on said second converter stage, means for coupling energy to said second converter from said local oscillator, means connecting the output of said second converter stage to said tuned circuit of said first converter stage, and means for deriving an intermediate frequency signal from said first converter stage in response to signals received in either of said frequency bands.

2. A tuner for signals in a high frequency band and a low frequency band, comprising first and second converter stages, a source of local oscillations, means for impressing local oscillations from said source on both said converter stages, means for selectively impressing signals received in said low frequency band on said first converter stage, means for simultaneously impressing signals received from a plurality of stations in said high frequency band on said second converter stage, means for impressing heterodyne signals derived from said second converter stage on said first converter stage, and means for deriving intermediate frequency signals from said first converter stage in response to signals received in either of said frequency bands, the frequency of said intermediate frequency signals being no greater than one-third the difference obtained by subtracting twice the highest frequency in said low frequency band from the lowest frequency in said high frequency band.

3. A tuner for signals in a high frequency band and a low frequency band, comprising a first converter stage including a tuned circuit for receiving signals in said low frequency band, a local oscillator, means for coupling energy derived from said oscillator to said first converter stage, a second converter stage having input terminals adapted to be connected to an antenna for simultaneously impressing signals received from all of the stations in said high frequency band on said second converter stage, means for coupling energy derived from said oscillator to said second converter stage, means connecting the output of said second converter stage to said first converter stage in place of signals received in said low frequency band, means for deriving an intermediate frequency signal from said first converter stage in response to signals received in either of said frequency bands, and means including a high pass filter in the input circuit of said second converter stage for preventing signals impressed upon said input terminals in said low frequency band from being impressed upon said second converter stage.

4. A tuner for signals of different frequencies within a given frequency band, comprising signal heterodyning means, means for simultaneously impressing on said signal heterodyning means a plurality of signals of different frequencies received in said frequency band, a local oscillator, means for impressing a signal derived from said oscillator on said signal heterodyning means, thereby simultaneously to heterodyne said local oscillator signal with all of said received signals, means including a tuned output circuit for selecting the heterodyne signal corresponding to one of said received signals while rejecting the heterodyne signals corresponding to said other received signals, and means for continuously varying the frequency of said local oscillator signal and said tuned output circuit in unison to select heterodyne signals corresponding to different ones of said received signals.

5. A tuner for signals of different frequencies within a given frequency band, comprising a detector network including an input coil, a crystal rectifier, an inductance and first condenser means connected in series circuit relation, means for impressing signals received in said frequency band on said input coil, said inductance and said first condenser means being series resonant within said frequency band, whereby said rectifier means varies the impedance across said condenser means at the frequency of said received signals, a local oscillator, means including a second condenser connected in series with said first condenser means for impressing a signal derived from said oscillator on said detector network to heterodyne the same with said received signals, and means including a tuned circuit for deriving from said first condenser means a heterodyne signal corresponding to one of said received signals but in a different frequency band.

6. A tuner for signals of different frequencies within a given frequency band, comprising a detector network including an input coil, an inductance and first condenser means connected in series, a pair of rectifiers connected between the ends of said input coil and said inductance, said inductance and said first condenser means being series resonant within said frequency band, means for impressing signals received in said frequency band on said input coil, said rectifiers being connected to said inductance in opposite polarity, whereby said rectifiers are rendered conductive over only a portion of each cycle of the received signals, a local oscillator, means including a second condenser connected in series with said first condenser means for impressing a signal derived from said oscillator on said detector network to heterodyne the same with said received signals, means including a tuned circuit for deriving from said first condenser means a heterodyne signal corresponding to one of said received signals but in a different frequency band, and means for preventing signals in said different frequency band from being impressed upon said first condenser means.

7. A television tuner for signals in both the UHF band and the VHF band, comprising a first converter stage, means for developing a local oscillator signal, means for impressing the fundamental frequency component of said local oscillator signal on said first converter stage, means for selectively impressing signals received in said VHF band on said first converter stage, means for deriving from said first converter stage intermediate frequency signals corresponding to signals received in said VHF band, a second converter stage, means for simultaneously impressing signals received from a plurality of stations in said UHF band on said second converter stage, means for impressing a harmonic frequency component of said local oscillator signal on said second converter stage, means for deriving from said second converter stage signals corresponding to signals received in said UHF band but having frequencies in said VHF band, and means for impressing said last named signals on said first converter stage while preventing signals received in said VHF band from being impressed thereon.

8. A television tuner for signals in both the UHF band and the VHF band, comprising a first converter stage, means for developing a substantially sinusoidal local oscillator signal, means for impressing said local oscillator signal on said first converter stage, means for selectively impressing signals received in said VHF band on said first converter stage, means for deriving from said first converter stage intermediate frequency signals corresponding to signals received in said VHF band, a second converter stage, means for simultaneously impressing a plurality of signals received in said UHF band on said second converter stage, symmetrical distortion means for converting said sinusoidal oscillator signal into a symmetrical square wave containing substantially no even harmonics of said oscillator signal, means for impressing said symmetrical square wave on said second converter stage, means for deriving from said second converter stage signals corresponding to signals received in said UHF band but having frequencies in said VHF band, and means for impressing said last named signals on said first converter stage while preventing signals received in said VHF band from being impressed thereon.

9. A television tuner for signals in both the UHF band and the VHF band, comprising a VHF converter stage, a local oscillator, means for coupling energy derived from said oscillator on said VHF converter stage, a balancing network, means including said balancing network for impressing signals received in said VHF band on said VHF converter stage, means for deriving from said VHF converter stage intermediate frequency signals corresponding to signals received in said VHF band, a UHF converter stage, means for simultaneously impressing signals received from a plurality of stations in said UHF band on said second converter stage, means for coupling energy derived from said oscillator to said UHF converter stage, means for deriving from said UHF converter stage signals corresponding to signals received in said UHF band but having frequencies in said VHF band, and means including said balancing network for coupling signals derived from said UHF converter stage to said VHF converter stage in place of signals received in said VHF band and in unbalanced relation with respect to ground.

(References on following page)

References Cited in the file of this patent

UNITED STATES PATENTS

| | | |
|---|---|---|
| 2,141,756 | Linsell | Dec. 27, 1938 |
| 2,383,322 | Koch | Aug. 21, 1945 |
| 2,468,041 | Couillard | Apr. 26, 1949 |
| 2,534,606 | Kolster | Dec. 19, 1950 |
| 2,596,117 | Bell | May 13, 1952 |
| 2,598,857 | Sziklai | June 3, 1952 |
| 2,640,919 | Bell | June 2, 1953 |
| 2,653,228 | Pan | Sept. 22, 1953 |
| 2,654,836 | Beck | Oct. 6, 1953 |
| 2,763,776 | Bussard | Sept. 18, 1956 |

OTHER REFERENCES

Book: Radio Receiver Design, by Sturley, 2nd edition, part 1, pages 319 and 320 cited, John Wiley and Sons, TK6563 S8, 1953.